United States Patent
Yang et al.

(10) Patent No.: US 11,183,710 B2
(45) Date of Patent: Nov. 23, 2021

(54) ELECTROLYTE SOLUTION FOR LITHIUM-SULFUR BATTERY AND LITHIUM-SULFUR BATTERY COMPRISING SAME

(71) Applicant: LG CHEM, LTD., Seoul (KR)

(72) Inventors: Seung Yoon Yang, Daejeon (KR); Doo Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 122 days.

(21) Appl. No.: 16/469,308

(22) PCT Filed: Dec. 8, 2017

(86) PCT No.: PCT/KR2017/014351
§ 371 (c)(1),
(2) Date: Jun. 13, 2019

(87) PCT Pub. No.: WO2018/216866
PCT Pub. Date: Nov. 29, 2018

(65) Prior Publication Data
US 2020/0106132 A1  Apr. 2, 2020

(30) Foreign Application Priority Data

May 26, 2017   (KR) ......................... 10-2017-0065508
Dec. 6, 2017   (KR) ......................... 10-2017-0166320

(51) Int. Cl.
*H01M 10/0567* (2010.01)
*H01M 10/052* (2010.01)

(52) U.S. Cl.
CPC ..... *H01M 10/0567* (2013.01); *H01M 10/052* (2013.01); *H01M 2300/0037* (2013.01)

(58) Field of Classification Search
CPC ...... H01M 4/38; H01M 4/381; H01M 10/052; H01M 10/0565; H01M 10/0567; H01M 10/0568; H01M 2220/10; H01M 2220/20; H01M 2300/0037; H01M 2300/0085; Y02E 60/10
See application file for complete search history.

(56) References Cited

U.S. PATENT DOCUMENTS

| | | | | |
|---|---|---|---|---|
| 6,743,549 | B1 * | 6/2004 | Doyle ............... | H01M 10/0569 429/217 |
| 2010/0129724 | A1 | 5/2010 | Kolosnitsyn | |
| 2010/0255383 | A1 | 10/2010 | Kofinas et al. | |
| 2011/0052998 | A1 | 3/2011 | Liang et al. | |
| 2013/0065127 | A1 * | 3/2013 | Nazar ................ | H01M 4/5815 429/218.1 |
| 2013/0273436 | A1 | 10/2013 | Shinmei et al. | |
| 2014/0272569 | A1 | 9/2014 | Cai et al. | |
| 2015/0010817 | A1 * | 1/2015 | Cui et al. | |
| 2015/0104690 | A1 | 4/2015 | Xiao et al. | |
| 2015/0171469 | A1 | 6/2015 | Kourtakis et al. | |
| 2016/0028127 | A1 | 1/2016 | Ahn et al. | |
| 2016/0093887 | A1 | 3/2016 | Jang et al. | |
| 2016/0164103 | A1 | 6/2016 | Son et al. | |
| 2018/0175375 | A1 | 6/2018 | Lecuyer et al. | |

FOREIGN PATENT DOCUMENTS

| | | | |
|---|---|---|---|
| CN | 105552437 | A | 5/2016 |
| JP | 62-020263 | * | 1/1987 |
| JP | 2011-521405 | A | 7/2011 |
| JP | 2016-091663 | * | 5/2016 |
| JP | 6004276 | B2 | 10/2016 |
| JP | 2018-160382 | * | 10/2018 |
| KR | 10-2005-0041093 | A | 5/2005 |
| KR | 10-2015-0032670 | A | 3/2015 |
| KR | 10-1497330 | B1 | 3/2015 |
| KR | 10-2015-0050507 | A | 5/2015 |
| KR | 10-2016-0026648 | A | 3/2016 |
| KR | 10-2016-0046775 | A | 4/2016 |
| KR | 10-1610446 | B1 | 4/2016 |
| KR | 10-2017-0003534 | A | 1/2017 |

OTHER PUBLICATIONS

Machine translation of JP 62-020263, published on Jan. 28, 1987 (Year: 1987).*
Machine translation of JP 2016-091663, published on May 23, 2016 (Year: 2016).*
Machine translation of JP 2018-160382, published on Oct. 11, 2018 (Year: 2018).*
International Search Report (PCT/ISA/210) issued in PCT/KR2017/014351, dated Apr. 24, 2018.
European Search Report for Appl. No. 17910613.3 dated Aug. 12, 2019.

* cited by examiner

*Primary Examiner* — Anca Eoff
(74) *Attorney, Agent, or Firm* — Birch, Stewart, Kolasch & Birch, LLP

(57) ABSTRACT

An electrolyte for a lithium-sulfur battery and the lithium-sulfur battery including the electrolyte, more particularly, an electrolyte for the lithium-sulfur battery including lithium salt, an organic solvent and an additive, wherein the additive includes an alkali metal salt-type ionomer. The electrolyte for the lithium-sulfur battery improves the migration characteristics of lithium ions and thus improves the capacity and life characteristics of the lithium-sulfur battery by including a polymer containing the alkali metal ion as an additive.

8 Claims, 1 Drawing Sheet

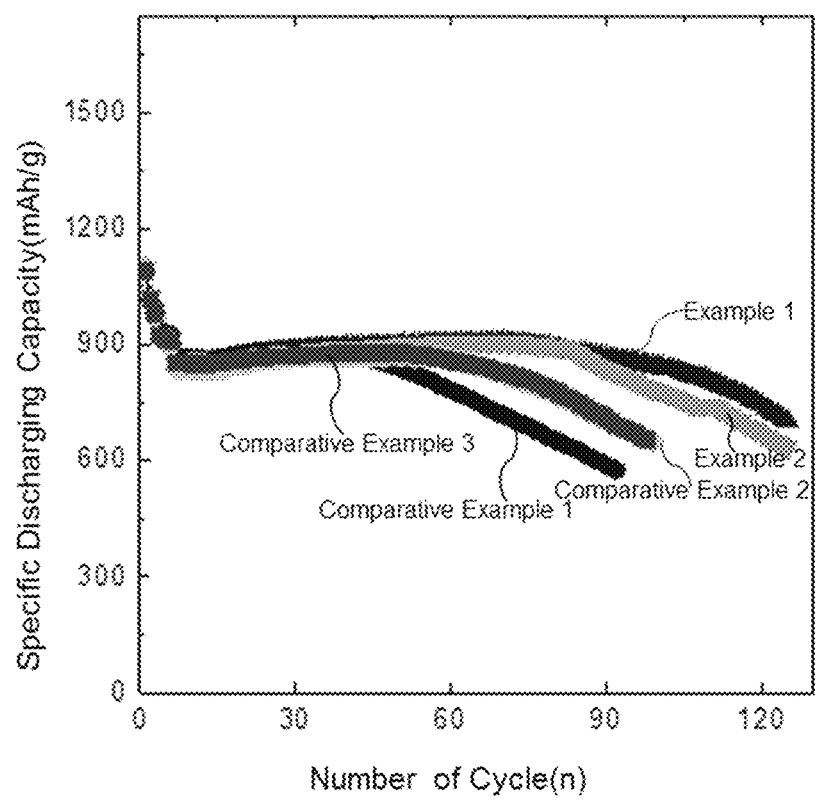

ELECTROLYTE SOLUTION FOR LITHIUM-SULFUR BATTERY AND LITHIUM-SULFUR BATTERY COMPRISING SAME

TECHNICAL FIELD

This application claims the benefits of Korean Patent Application No. 10-2017-0065508, filed on May 26, 2017 and Korean Patent Application No. 10-2017-0166320, filed on Dec. 6, 2017 with the Korean Intellectual Property Office, the disclosure of which are herein incorporated by reference in their entirety.

The present invention relates to an electrolyte for a lithium-sulfur battery and the lithium-sulfur battery comprising the same.

BACKGROUND ART

Recently, electronic devices and communication devices are rapidly becoming smaller, lighter and higher performance and the need for electric vehicles has been greatly increased in relation to environmental problems. According to this, there is a growing demand for performance improvements in secondary batteries used as energy sources for these products. For the secondary battery satisfying the demand, many studies have been conducted on a lithium-sulfur battery using sulfur-based materials as a positive electrode active material.

The lithium-sulfur battery is a secondary battery that uses a sulfur-based compound including a sulfur-sulfur bond as a positive electrode active material and uses a carbon-based material, which is capable of intercalating or deintercalating alkali metal such as lithium or metal ion such as lithium ion, as a negative electrode active material.

In particular, the theoretical discharging capacity of the lithium-sulfur battery is 1,675 mAh/g and its theoretical energy density is 2,600 Wh/kg. Since the theoretical energy density of the lithium-sulfur battery is about 5 times higher than that of the lithium ion battery (about 570 Wh/kg) currently under study, the lithium-sulfur battery is a battery capable of high capacity, high energy density and long life. In addition, since sulfur, which is the main material of positive electrode active material, has a low atomic weight, is rich in resources, is easy to supply, is cheap, is non-toxic and is an environmentally friendly substance, the lithium-sulfur battery has received attention as a source of energy for medium to large-sized devices such as electric vehicles as well as portable electronic devices.

Specifically, an oxidation reaction of lithium occurs at the negative electrode of the lithium-sulfur battery and a reduction reaction of sulfur occurs at the positive electrode. Sulfur before discharging has an cyclic $S_8$ structure. During the reduction reaction (discharging), as the sulfur-sulfur bond is broken, the oxidation number of sulfur decreases, and during the oxidation reaction (charging), as the sulfur-sulfur bond is formed again, the oxidation number of S increases. Electrical energy is stored and generated using this oxidation-reaction reaction. During this electrochemical reaction, the sulfur is converted from the $S_8$ of cyclic structure to lithium polysulfide ($Li_2S_x$, x=8, 6, 4, 2) of linear structure by the reduction reaction. When the lithium polysulfide is completely reduced, the lithium sulfide ($Li_2S$) is finally produced. By the process of reducing to each lithium polysulfide, the discharging behavior of the lithium-sulfur battery exhibits a step-wise discharging voltage unlike lithium ion battery.

Among lithium polysulfides such as $Li_2S_8$, $Li_2S_6$, $Li_2S_4$ and $Li_2S_2$ which are the intermediate product of the electrochemical reaction in the lithium-sulfur battery, the lithium polysulfide ($Li_2S_x$, usually x>4) which has a high oxidation number of sulfur is a substance with a strong polarity and is easily dissolved in an electrolyte containing hydrophilic organic solvent. The polysulfide dissolved in the electrolyte diffuses far away from the positive electrode by the concentration difference. The lithium polysulfide thus eluted from the positive electrode is out of the electrochemical reaction zone of the positive electrode, and thus the stepwise reduction to lithium sulfide ($Li_2S$) is impossible. That is, since the lithium polysulfide which is far away from the positive electrode and exists in a dissolved state in the electrolyte cannot participate in the charging and discharging reaction of the battery, sulfur used as the positive electrode active material is lost and the loss of sulfur is a major factor in reducing capacity and life time of the lithium-sulfur battery.

Furthermore, in addition to being floated on or precipitated in the electrolyte, since the eluted lithium polysulfide reacts directly with the lithium metal as the negative electrode and lithium sulfide is stuck the surface of the lithium metal, the reaction activity is lowered and the potential characteristics are deteriorated, thus causing the problem of corrosion of the negative electrode.

In order to minimize the elution of the lithium polysulfide, various methods are being studied, which include a method of adding an additive having a property of adsorbing sulfur to the positive electrode complex or the electrolyte, a method of surface-treating the surface of the positive electrode active material with a substance containing a specific functional group, a method of using a composite containing sulfur in a carbon material or a metal oxide as a positive electrode active material or the like.

As an example, Korean Patent Application Publication No. 2015-0032670 discloses that by adding a nitrogen-containing additive, a sulfur-containing additive or an organic peroxide to the electrolyte, the elution of the lithium polysulfide can be suppressed and thus the problem of performance reduction of the battery can be improved.

In addition, Korean Patent Application Publication No. 2016-0046775 discloses that a positive electrode coating layer made of an amphipathic polymer is provided on the surface of the positive electrode active part including the sulfur-carbon composite to prevent the lithium polysulfide from eluting into the electrolyte, thereby improving the capacity and cycle characteristics of the battery.

These patents inhibit the elution of the lithium polysulfide to some extent through the additive or the coating layer, but the effect is not sufficient. In addition, there are disadvantages that when using the additives, a problem of deterioration of electrical conductivity or promotion of side reactions of the battery occurs, and when forming the coating layer, the sulfur is lost in the surface treatment process and it takes much time and cost. Therefore, there is further need to develop a lithium-sulfur battery which can effectively suppress the reduction of the capacity and life time of the lithium-sulfur battery due to the elution of lithium polysulfide in the lithium-sulfur battery.

PRIOR ART LITERATURE

Patent Literature

Korean Patent Application Publication No. 2015-0032670 (2015 Mar. 27), ELECTROCHEMICAL CELLS COM- PRISING ELECTROLYTE ADDITIVES AND IONOMER ARTICLES, AND METHODS FOR MAKING AND USING THE SAME Korean Patent Application Publication No. 2016-0046775 (2016 Apr. 29), CATHODE FOR LITHIUM-SULFUR BATTERY AND METHOD OF PREPARING THE SAME

DISCLOSURE

Technical Problem

As a result of various studies to solve the above problem, the inventors of the present invention have identified that when the electrolyte for the lithium-sulfur battery includes an alkali metal ion-containing polymer as an additive, the conductivity of the lithium ion is improved to improve the stability, performance and life of the battery, thereby completing the present invention.

Accordingly, it is an aspect of the present invention to provide an electrolyte for the lithium-sulfur battery having excellent performance and life characteristics.

In addition, another aspect of the present invention is to provide the lithium-sulfur battery comprising the electrolyte.

Technical Solution

According to an aspect of the present invention, the present invention provides an electrolyte for the lithium-sulfur battery, comprising a lithium salt, an organic solvent and an additive, wherein the additive includes an alkali metal ion-containing polymer (also referred to as an alkali metal salt-type ionomer).

The alkali metal ion-containing polymer may comprise at least one ionic group selected from the group consisting of carboxylate group, sulfonate group, sulfonyl group, sulfate group, sulfinate group, phosphate group and phosphonate group.

The alkali metal ion-containing polymer may be represented by the following Formula 1:

[Formula 1]

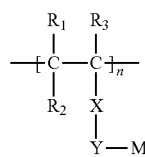

wherein $R_1$ to $R_3$, X, Y, M and n are as described in the specification.

The alkali metal ion-containing polymer may comprise at least one selected from the group consisting of lithium poly(acrylate), lithium poly(methacrylate), lithium poly(styrene sulfonate), lithium poly(2-acrylamido-2-methyl-1-propanesulfonate) and lithium poly(vinyl sulfonate).

A number average molecular weight of the alkali metal ion-containing polymer may be in a range of from 1,000 to 10,000.

The alkali metal ion-containing polymer may be included in the electrolyte in an amount of from 0.1 to 0.5% by weight, based on a total electrolyte for the lithium-sulfur battery.

According to another aspect of the present invention, the present invention also provides a lithium-sulfur battery comprising the electrolyte.

Advantageous Effects

When the electrolyte for the lithium-sulfur battery according to the present invention includes an ionomer including an alkali metal salt as an additive, the migration characteristics of lithium ions can be improved to improve the capacity and life characteristics of the lithium-sulfur battery.

DESCRIPTION OF DRAWINGS

The FIGURE is a graph showing life characteristics of a battery according to Experimental Example 1 of the present invention.

BEST MODE

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Since the lithium-sulfur battery has a much higher theoretical energy density than the conventional secondary battery and sulfur, which is used as a positive electrode active material, has the advantage of being abundant in reserves and low in price and being environmentally friendly, the lithium-sulfur battery has received attention as a next-generation battery.

Despite these advantages, as described above, the lithium polysulfide formed on the positive electrode during the charging and discharging reactions in the lithium-sulfur battery is eluted from the reaction area of the positive electrode and a shuttle phenomenon of the lithium polysulfide moving between the positive electrode and the negative electrode occurs, and thus sulfur, which is a positive electrode active material, is lost, thereby resulting in the reduction in capacity and life time of the battery. Also, due to the side reaction between the lithium polysulfide eluted from the positive electrode and lithium metal, there is a problem that the reduction of efficiency and life time of lithium metal electrode is accelerated.

In order to prevent this, a method of minimizing the loss of positive electrode active material by using an additive or coating layer that adsorbs sulfur or forming a complex with the nanostructure, thereby constraining the lithium polysulfide was used in the prior art. However, the problems of elution of lithium polysulfide and thus the reduction of performance and life time were not effectively improved.

Accordingly, the present invention provides an electrolyte for the lithium-sulfur battery, which comprises an alkali metal ion-containing polymer as an additive in order to ensure the effect of improving the performance and life time of the lithium-sulfur battery and improve the reaction stability of the battery.

Specifically, the electrolyte for the lithium-sulfur battery according to the present invention includes a lithium salt, an organic solvent and an additive, wherein the additive includes an alkali metal salt-type ionomer.

The ionomer is a polymer having an ionic property, and is a copolymer composed of non-polar repeating units formed by covalent bond having no ionic property and ionic repeating units, wherein the ionic repeating units are contained within 15%, and ionic groups contained in the ionic repeating units are neutralized (or substituted) with metal ions. Therefore, the ionomer of the present invention refers to any polymer material which has metal ions introduced into the main chain or side chain of the polymer. In that case, the ionic group of the ionomer may be partially neutralized or fully neutralized with the alkali metal ion. As an example, it can be neutralized to 50 to 100% based on the total ionic groups contained in the ionomer.

In the present invention, the ionomer includes an acidic group as an ionic group, and may be, for example, poly(acrylic acid) (PAA), poly(methacrylic acid) (PMA), poly(styrene sulfonic acid) (PSSA), poly(2-acrylamido-2-methyl-1-propanesulfonic acid) (PAMPSA), poly(vinyl sulfonic acid) (PVSA), Nafion (registered trademark) and the like.

The ionic group may comprise at least one selected from the group consisting of a carboxylate group (—C(=O)O—), a sulfonate group (—S(=O)$_2$O—), a sulfonyl group (—S(=O)$_2$—), a sulfate group (—OS(=O)$_2$O—), a sulfinate group (—S(=O)O—), a phosphate group (—OP(=O)O$_2$—) and a phosphonate group (—P(=O)O$_2$—). Preferably, the ionic group may be a carboxylate group, a sulfonate group and a phosphonate group, more preferably a carboxylate group.

In the present invention, the ionomer includes the ionic groups as described above, some of these can be ionized in the electrolyte and then can be replaced with alkali metal, and the thus substituted form is called alkali metal salt-type ionomer.

The alkali metal salt-type ionomer of the present invention may be represented by the following Formula 1:

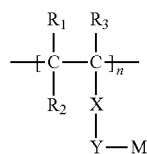

[Formula 1]

wherein $R_1$ to $R_3$ are the same or different from each other and each independently hydrogen; substituted or unsubstituted alkyl group having 1 to 20 carbon atoms; substituted or unsubstituted alkoxy group having 1 to 20 carbon atoms; substituted or unsubstituted alkenyl group having 2 to 20 carbon atoms; substituted or unsubstituted alkynyl group having 2 to 20 carbon atoms; substituted or unsubstituted aryl group having 6 to 30 carbon atoms; substituted or unsubstituted aryloxy group having 6 to 30 carbon atoms; substituted or unsubstituted heteroaryl group having 6 to 30 carbon atoms; substituted or unsubstituted heteroaryloxy group having 6 to 30 carbon atoms; substituted or unsubstituted cycloalkyl group having 3 to 20 carbon atoms or substituted or unsubstituted heterocycloalkyl group having 3 to 20 carbon atoms, X is single bond; substituted or unsubstituted alkanediyl group having 1 to 20 carbon atoms; substituted or unsubstituted alkenediyl group having 2 to 20 carbon atoms; substituted or unsubstituted alkynediyl group having 2 to 20 carbon atoms; —C(=O)NH—$R_4$; substituted or unsubstituted arylene group having 6 to 30 carbon atoms or substituted or unsubstituted heteroarylene group having 6 to 30 carbon atoms, wherein $R_4$ is alkanediyl group having 1 to 5 carbon atoms, Y is at least one selected from the group consisting of a carboxylate group, a sulfonate group, a sulfonyl group, a sulfate group, a sulfinate group, a phosphate group and a phosphonate group, M is alkali metal, and n is an integer of 100 to 1500.

The term "alkyl group" as used in the present invention may be linear or branched, and the number of carbon atoms thereof is not particularly limited, but is preferably 1 to 20, and more preferably 1 to 10. Specific examples include, but are not limited to, a methyl group, an ethyl group, a propyl group, an isopropyl group, a butyl group, a t-butyl group, a pentyl group, a hexyl group and a heptyl group.

The term "alkoxy group" as used in the present invention refers to, unless otherwise stated, an alkyl group having 1 to 20 carbon atoms and having oxygen radical, but is not limited thereto.

The term "alkenyl group" as used in the present invention refers to, unless otherwise stated, a hydrocarbon group having at least one carbon-carbon double bond and having 2 to 20 carbon atoms, but is not limited thereto.

The term "alkynyl group" as used in the present invention refers to, unless otherwise stated, a hydrocarbon group having at least one carbon-carbon triple bond and having 2 to 20 carbon atoms, but is not limited thereto.

The term "cycloalkyl group" as used in the present invention refers to a non-aromatic carbocyclic ring consisting of at least three carbon atoms. Such cycloalkyl groups include, but are not limited to, cyclopropyl, cyclobutyl, cyclopentyl, cyclohexyl, and the like.

The term "heterocycloalkyl group" as used in the present invention refers to a cycloalkyl group in which at least one carbon is replaced by a heteroatom. The heteroatom refers to at least one selected from the group consisting of nitrogen (N), oxygen (O), sulfur (S), phosphorus (P) and silicon (Si).

The term "aryl group" as used in the present invention refers to a single or multiple aromatic carbocyclic ring having 6 to 30 carbon atoms. Examples of the aryl group include, but are not limited to, a phenyl group, a biphenyl group, a fluorene group and the like.

The term "aryloxy group" as used in the present invention refers to, but is not limited to, an aryl group having 6 to 30 carbon atoms and including oxygen radical, unless otherwise stated.

The term "heteroaryl group" as used in the present invention refers to an aryl group in which at least one carbon is replaced by a heteroatom, and the heteroatoms are as described above.

The term "heteroaryloxy" as used in the present invention refers to an aryloxy group in which at least one carbon is replaced by a heteroatom, and the heteroatoms are as described above.

The term "alkanediyl group" as used in the present invention is a divalent atomic group obtained by subtracting two hydrogen atoms from a straight-chain or branched-chain alkane, and may be represented by the general formula —$C_nH_{2n}$—.

The term "alkenediyl group" as used in the present invention is a divalent atomic group obtained by subtracting two hydrogen atoms from a straight-chain or branched-chain alkene, and may be represented by the general formula —$C_nH_n$—.

The term "alkynediyl group" as used in the present invention is a divalent atomic group obtained by subtracting two hydrogen atoms from a straight-chain or branched-chain alkyne.

The term "arylene group" as used in the present invention refers to a divalent aromatic carbon-based ring and its carbon number may be 6 to 30, specifically 6 to 20. The arylene group may include a structure in which two or more rings are condensed or bonded, and the other ring may be aromatic, non-aromatic, or a combination thereof. For example, the arylene group includes, but is not limited to, phenylene, biphenylene, naphthylene, anthracenylene, and the like.

The term "heteroarylene group" as used in the present invention refers to an arylene group in which at least one carbon is replaced by a heteroatom, and the heteroatoms are as described above.

The term "alkali metal" as used in the present invention is lithium (Li), sodium (Na) or potassium (K).

The term "substituted" of "substituted or unsubstituted" as used in the present invention means to be substituted by at least one substituent selected from the group consisting of, without limitation, halogen, an amino group, a nitrile group, a nitro group, a hydroxyl group, a carbonyl group, an oxy group, a carbonyloxy group, an iminocarbonyl group, an iminosulfonyl group, a sulfanyl group, a sulfinyl group, a sulfonyl group, a sulfonyloxy group, an alkyl group, an alkenyl group, an alkynyl group, an aryl group, and a heteroaryl group.

In the above Formula 1, $R_1$ to $R_3$ are preferably hydrogen; substituted or unsubstituted alkyl group having 1 to 20 carbon atoms; substituted or unsubstituted alkoxy group having 1 to 20 carbon atoms or substituted or unsubstituted aryl group having 6 to 30 carbon atoms, more preferably hydrogen or substituted or unsubstituted alkyl group having 1 to 20 carbon atoms.

In the above Formula 1, X is preferably single bond; substituted or unsubstituted alkanediyl group having 1 to 20 carbon atoms or substituted or unsubstituted arylene group having 6 to 30 carbon atoms.

In the above Formula 1, Y is, as described above, an ionic group including an acidic group, preferably a carboxylate group, a sulfonate group or a phosphonate group, more preferably a carboxylate group.

In the above Formula 1, M may be alkali metal ion, preferably lithium ion.

In the above Formula 1, n is an integer of 100 to 1500, preferably an integer of 150 to 500.

The alkali metal salt-type ionomer represented by the above Formula 1 contains a large amount of lithium ions in the molecule, thereby greatly increasing the ionic conductivity of the electrolyte even if only a small amount is added to the electrolyte. When the concentration of the lithium salt is increased by the conventional method for increasing the lithium ion conductivity, the viscosity of the electrolyte was increased and sufficient effect was not obtained due to deterioration of the electrolytic salt and occurrence of side reactions of the battery. In contrast, in the present invention, the concentration of lithium ions in the electrolyte can be increased without affecting other electrolytic salts or additives by using the alkali metal salt-type ionomer, a polymer-type substance, as an additive. This method can also be combined with the advantages that the consumption of lithium ions due to the charging and discharging process or decomposition of the electrolyte by the progress of the cycle may be compensated.

The alkali metal salt-type ionomer of Formula 1 may include, for example, at least one selected from the group consisting of lithium poly(acrylate) (PALi), lithium poly(methacrylate) (PMALi), lithium poly(styrene sulfonate) (PSSLi), lithium poly(2-acrylamido-2-methyl-1-propanesulfonate) (PAMPSLi) and lithium poly(vinyl sulfonate) (PVSLi). The alkali metal salt-type ionomer may be preferably at least one selected from the group consisting of lithium poly(acrylate), lithium poly(styrene sulfonate) and lithium poly(vinyl sulfonate), more preferably may be lithium poly(acrylate).

A number average molecular weight of the alkali metal salt-type ionomer may be in a range of from 1,000 to 10,000, preferably from 1,500 to 5,000. When the number average molecular weight is less than the above range, the desired lithium ion conductivity improvement effect cannot be obtained. When the number average molecular weight exceeds the above range, since it is difficult to prepare the aqueous solution in the ion exchange process, it is difficult to obtain a desired degree of substitution and the viscosity of the electrolyte is increased, and thus not only uniform dispersion is difficult, but also problems such as deterioration of electrolyte or reduction of mobility of lithium ion may occur.

The alkali metal salt-type ionomer of the present invention can be prepared by neutralizing the polymer having the ionic group with a base compound containing an alkali metal. In this case, a conventional method can be used as the neutralization method. The base compound may be at least one selected from the group consisting of sodium hydroxide, sodium carbonate, lithium hydroxide and potassium hydroxide.

The alkali metal salt-type ionomer may be included in an amount of from 0.1 to 5% by weight, preferably from 0.2 to 2% by weight, based on the total electrolyte for the lithium-sulfur battery. When the content of the alkali metal salt-type ionomer is less than the above range, the effect of increasing the lithium ion conductivity is insufficient. On the other hand, if the content exceeds the above range, the performance of the battery may deteriorate due to unnecessary reaction when the battery is driven.

The electrolyte for the lithium-sulfur battery of the present invention includes a lithium salt as an electrolyte salt to increase ion conductivity. The lithium salt is not particularly limited in the present invention and may be used without limitation as long as it is commonly used in the art. For example, the lithium salt may include at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lithium lower aliphatic carboxylate having 4 or less carbon atoms, lithium tetraphenyl borate and lithium imide. Preferably, the lithium salt may be $(SO_2F)_2NLi$ (lithium bis(fluorosulfonyl)imide, LiFSI).

A concentration of the lithium salt may be determined in consideration of ion conductivity and the like, and may be, for example, from 0.1 to 4.0 M, preferably from 0.5 to 2.0 M. When the concentration of the lithium salt is less than the above range, it is difficult to ensure ion conductivity suitable for driving the battery. On the other hand, when the concentration exceeds the above range, the viscosity of the electrolyte is increased to lower the mobility of the lithium ion and the decomposition reaction of the lithium salt itself may increase to deteriorate the performance of the battery. Therefore, the concentration is adjusted appropriately within the above range.

The electrolyte for the lithium-sulfur battery of the present invention includes an organic solvent, and those commonly used in the electrolyte for the lithium secondary battery can be used in the electrolyte for the lithium-sulfur battery of the present invention without limitation. For example, ethers, esters, amides, linear carbonates, cyclic carbonates, etc. may be used alone or in combination of two or more.

The ether-based solvent may include non-cyclic ethers and cyclic ethers.

As an example, the non-cyclic ether may include, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether, polyethylene glycol methylethyl ether.

As an example, the cyclic ether may include, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyl tetrahydrofuran, 2,5-dimethyl tetrahydrofuran, 2,5-dimethoxy tetrahydrofuran, 2-ethoxy tetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene, isosorbide dimethyl ether.

Examples of the ester solvent of the organic solvent may include, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone, and ε-caprolactone, or a mixture of two or more thereof.

Specific examples of the linear carbonate solvent may include, but is not limited to, at least one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more thereof.

In addition, specific examples of the cyclic carbonate solvent may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a mixture of two or more thereof. Examples of such halides include, but are not limited to, fluoroethylene carbonate (FEC) and the like.

The electrolyte for the lithium secondary battery of the present invention may further include additives commonly used in the related art in addition to the above-mentioned components. As an example, the additive may include lithium nitrate ($LiNO_3$), potassium nitrate (KNOB), cesium nitrate ($CsNO_3$), magnesium nitrate ($MgNO_3$), barium nitrate ($BaNO_3$), lithium nitrite ($LiNO_2$), potassium nitrite ($KNO_2$), cesium nitrite ($CsNO_2$) and the like.

In addition, the present invention provides the lithium-sulfur battery including the electrolyte for the lithium-sulfur battery.

The lithium-sulfur battery includes a positive electrode, a negative electrode, and a separator and an electrolyte interposed between the positive electrode and the negative electrode, wherein the electrolyte for the lithium-sulfur battery according to the present invention is used as the electrolyte.

The positive electrode may include a positive electrode current collector and a positive electrode active material coated on one or both sides of the positive electrode current collector.

The positive electrode current collector supports the positive electrode active material and is not particularly limited as long as it has high conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam or nonwoven fabric.

The positive electrode active material may include a positive electrode active material and optionally a conductive material and a binder.

The positive electrode active material may include at least one selected from the group consisting of inorganic sulfur ($S_8$), $Li_2S_n$ (n≥1), an organic sulfur compound or a carbon-sulfur polymer (($C_2S_x)_n$: x=2.5~50, n≥2). Preferably, inorganic sulfur ($S_8$) can be used.

The positive electrode may further include at least one additive selected from a transition metal element, a group IIIA element, a group IVA element, a sulfur compound of these elements, and an alloy of these elements and sulfur, in addition to the positive electrode active material.

The transition metal element may include Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may include Al, Ga, In, Ti and the like, and the group IVA element may include Ge, Sn, Pb, and the like.

The conductive material is intended to improve electrical conductivity and is not particularly limited as long as it is an electron conductive material that does not cause chemical change in the lithium secondary battery.

Generally, carbon black, graphite, carbon fiber, carbon nanotube, metal powder, conductive metal oxide, organic conductive material and the like can be used. Products that are currently marketed as conductive materials may include acetylene black series (products from Chevron Chemical Company or Gulf Oil Company), Ketjen Black EC series (products from Armak Company), Vulcan XC-72 (a product from Cabot Company) and Super P (a product from MMM). Examples thereof may include acetylene black, carbon black, graphite and the like.

In addition, the positive electrode active material may further include a binder having a function of holding the positive electrode active material on the positive electrode current collector and connecting between active materials. As the binder, for example, various types of binders such as polyvinylidene fluoride-hexafluoropropylene (PVDF-co-HFP), polyvinylidene fluoride (PVDF), polyacrylonitrile, polymethyl methacrylate, styrene-butadiene rubber (SBR), carboxyl methyl cellulose (CMC) and the like can be used.

The negative electrode may include a negative electrode current collector and a negative electrode active material on the negative electrode current collector, or the negative electrode may be a lithium metal plate.

The negative electrode collector is for supporting a negative electrode active material and is not particularly limited as long as it is electrochemically stable in the voltage range of the lithium secondary battery while having excellent conductivity. For example, copper, stainless steel, aluminum, nickel, titanium, palladium, sintered carbon; copper or stainless steel surface-treated with carbon, nickel, silver or the like; aluminum-cadmium alloy or the like may be used as the negative electrode current collector.

The negative electrode current collector can enhance the bonding force with the negative electrode active material by having fine irregularities formed on its surface, and may be formed in various forms such as film, sheet, foil, mesh, net, porous body, foam or nonwoven fabric.

The negative electrode active material may include a material capable of reversibly intercalating or deintercalating lithium ion ($Li^+$), a material capable of reversibly forming lithium containing compounds by reacting with lithium ion, or lithium metal or lithium alloy. The material capable of reversibly intercalating or deintercalating lithium ion ($Li^+$) can be, for example, crystalline carbon, amorphous carbon, or a mixture thereof. The material capable of reacting with lithium ion ($Li^+$) to reversibly form lithium containing compounds may be, for example, tin oxide, titanium nitrate or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn). Preferably, the negative electrode active material may be lithium metal, and specifically may be in the form of a lithium metal thin film or lithium metal powder.

The method for forming the negative electrode active material is not particularly limited, and a layer or film forming method commonly used in the art can be used. For example, methods such as compression, coating, or deposition can be used. In addition, a metal lithium thin film formed on a metal plate by initial charging after assembling the battery without the lithium thin film in the current collector is also included in the negative electrode of the present invention.

The separator is used to physically separate both electrodes in the lithium-sulfur battery of the present invention, and may be used without any particular limitations as long as it is commonly used as a separator in the lithium-sulfur battery. Particularly, it is desirable to use a separator having excellent wettability to the electrolyte while having low resistance to ion migration of the electrolyte.

The separator may be formed of a porous substrate, and the porous substrate may be any porous substrate commonly used in an electrochemical device. For example, a polyolefin-based porous membrane or a nonwoven fabric may be used as the porous substrate, but it is not particularly limited thereto.

Examples of the polyolefin-based porous membrane may include a membrane formed of polyolefin-based polymer such as polyethylene such as high-density polyethylene, linear low-density polyethylene, low density polyethylene and ultra-high molecular weight polyethylene, polypropylene, polybutylene and polypentene alone or a mixture thereof.

The nonwoven fabric may include, in addition to the polyolefin-based nonwoven fabric, for example, a nonwoven fabric formed of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide and polyethylenenaphthalate alone or a mixture thereof. The structure of the nonwoven fabric may be a spun bond nonwoven fabric or a melt blown nonwoven fabric composed of long fibers.

The thickness of the porous substrate is not particularly limited, but may be from 1 to 100 μm, preferably from 5 to 50 μm.

The size and porosity of the pores present in the porous substrate are also not particularly limited, but may be from 0.001 to 50 μm and from 10 to 95%, respectively.

The electrolyte includes lithium ion, through which the electrochemical oxidation or reduction reaction between the positive electrode and the negative electrode occurs. The electrolyte is the same as described above.

The injection of the electrolyte may be performed at the appropriate stage of the manufacturing process of the electrochemical device, depending on the manufacturing process and required properties of the final product. That is, the injection can be performed before assembling the electrochemical device or at the final stage of assembling the electrochemical device.

The lithium-sulfur battery according to the present invention can be manufactured by lamination, stacking and folding processes of the separator and the electrodes, in addition to the usual winding process.

The shape of the lithium-sulfur battery is not particularly limited, and may be various shapes such as a cylindrical shape, a laminate shape and a coin shape.

Also, the present invention provides a battery module including the lithium-sulfur battery as a unit battery.

The battery module may be used as a power source for medium to large-sized devices requiring high temperature stability, long cycle characteristics and high capacity characteristics.

Examples of such medium to large-sized devices may include, but is not limited to, a power tool powered by an electric motor; an electric vehicle including an electric vehicle (EV), a hybrid electric vehicle (HEV), a plug-in hybrid electric vehicle (PHEV) and the like; an electric motorcycle including an electric bike (E-bike) and an electric scooter (E-scooter); an electric golf cart; a power storage system; etc.

MODE FOR INVENTION

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention. Such variations and modifications are within the scope of the appended claims.

Examples and Comparative Examples: Preparation of Electrolyte

An electrolyte for the lithium-sulfur battery was prepared according to the composition shown in Table 1 below.

TABLE 1

| | Lithium salt | Organic solvent (ratio by volume) | Additive |
|---|---|---|---|
| Example 1 | 1.0M $(SO_2F_3)_2NLi$ | $DOL^{1)}:DME^{2)}$ (1:1) | 1% by weight $LiNO_3$ 0.5% by weight $PALi^{3)}$ |
| Example 2 | 1.0M $(SO_2F_3)_2NLi$ | $DOL^{1)}:DME^{2)}$ (1:1) | 1% by weight $LiNO_3$ 0.2% by weight PALi |
| Comparative Example 1 | 1.0M $(SO_2F_3)_2NLi$ | $DOL^{1)}:DME^{2)}$ (1:1) | 1% by weight $LiNO_3$ |

TABLE 1-continued

| | Lithium salt | Organic solvent (ratio by volume) | Additive |
|---|---|---|---|
| Comparative Example 2 | 1.0M $(SO_2F_3)_2NLi$ | $DOL^{1)}:DME^{2)}$ (1:1) | 1% by weight $LiNO_3$ 0.5% by weight lithium succinate |
| Comparative Example 3 | 1.0M $(SO_2F_3)_2NLi$ | $DOL^{1)}:DME^{2)}$ (1:1) | 1% by weight $LiNO_3$ 0.5% by weight lithium oxalate |

$^{1)}$1,3-dioxolane
$^{2)}$1,2-dimethoxyethane
$^{3)}$PALi: lithium poly(acrylate) ($M_n$ = 1800)

Experimental Example 1: Evaluation of Life Characteristics

Sulfur was mixed with a conductive material and a binder in acetonitrile using a ball mill to prepare a slurry of positive electrode active material. In that case, carbon black was used as a conductive material, and polyethylene oxide (molecular weight: 5,000,000 g/mole) was used as a binder. The mixing ratio by weight was set to 90:5:5 of sulfur: conductive material: binder. The slurry of the positive electrode active material was coated on an aluminum current collector and dried to produce a positive electrode.

A lithium metal thin film with a thickness of 40 μm was used as the negative electrode.

The prepared positive electrode and negative electrode were positioned to face each other, and a polyethylene separator was interposed therebetween, and then, the electrolyte prepared in the above Examples and Comparative Examples were injected to prepare coin type batteries.

The batteries prepared by the above method were repeatedly discharged and charged 2.5 times at a current density of 0.1 C, and then discharged and charged 3 times at a current density of 0.2 C. Thereafter, the life characteristics of the batteries were confirmed while the batteries were being subjected to 150 cycles at a current density of 0.5 C respectively. The results obtained at this time are shown in the FIGURE.

Referring to the FIGURE, it was identified that the life characteristics of the batteries including the electrolyte according to the Examples were superior to those of the Comparative Examples.

Specifically, as shown in the FIGURE, it was identified that the capacity sharply drops before 60 cycles in case of Comparative Example 1 which does not include an additive, and the irreversible capacities were maintained up to 80 cycles in the case of Comparative Examples 2 and 3 using the existing monomolecular compound, whereas the maintenance rates of the non-discharging capacities were stably maintained up to 110 cycles in the case of the electrolyte of Examples 1 and 2 according to the present invention. As a result, it was identified that in the case of the electrolyte according to the present invention, the lithium ions were easily transferred and the depletion of the lithium ions is delayed.

INDUSTRIAL APPLICABILITY

The electrolyte for the lithium-sulfur battery according to the present invention includes an alkali metal ion-containing polymer as an additive to improve the migration characteristics of the lithium ion, thereby enabling the lithium-sulfur battery to have high capacity, high stability and long life.

The invention claimed is:

1. An electrolyte for a lithium-sulfur battery comprising:
a lithium salt,
an organic solvent and
an additive,
wherein the additive comprises an alkali metal ion-containing polymer and lithium nitrate,
wherein the alkali metal ion-containing polymer is represented by the following Formula 1:

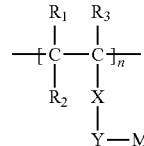

Formula 1 wherein
$R_1$ to $R_3$ are the same or different from each other and each independently hydrogen; substituted or unsubstituted alkyl group having 2 to 20 carbon atoms; substituted or unsubstituted alkoxy group having 1 to 20 carbon atoms; substituted or unsubstituted alkenyl group having 2 to 20 carbon atoms; substituted or unsubstituted alkynyl group having 2 to 20 carbon atoms; substituted or unsubstituted aryl group having 6 to 30 carbon atoms; substituted or unsubstituted aryloxy group having 6 to 30 carbon atoms; substituted or unsubstituted heteroaryl group having 6 to 30 carbon atoms; substituted or unsubstituted heteroaryloxy group having 6 to 30 carbon atoms; substituted or unsubstituted cycloalkyl group having 3 to 20 carbon atoms; or substituted or unsubstituted heterocycloalkyl group having 3 to 20 carbon atoms,
X is single bond; substituted or unsubstituted alkanediyl group having 1 to 20 carbon atoms; substituted or unsubstituted alkenediyl group having 2 to 20 carbon atoms; substituted or unsubstituted alkynediyl group having 2 to 20 carbon atoms; —C(=O)NH—$R_4$; substituted or unsubstituted arylene group having 6 to 30 carbon atoms; or substituted or unsubstituted heteroarylene group having 6 to 30 carbon atoms, wherein $R_4$ is alkanediyl group having 1 to 5 carbon atoms,
Y is at least one ionic group selected from the group consisting of a carboxylate group, a sulfonate group, a sulfonyl group, a sulfate group, a sulfinate group, a phosphate group and a phosphonate group,
M is alkali metal, and
n is an integer of 100 to 1500.

2. The electrolyte for the lithium-sulfur battery of claim 1, wherein the alkali metal ion-containing polymer comprises at least one selected from the group consisting of lithium poly(acrylate), lithium poly(styrene sulfonate), lithium poly(2-acrylamido-2-methyl-1-propanesulfonate) and lithium poly(vinyl sulfonate).

3. The electrolyte for the lithium-sulfur battery of claim 1, wherein a number average molecular weight of the alkali metal ion-containing polymer is in a range of from 1,000 to 10,000.

4. The electrolyte for the lithium-sulfur battery of claim 1, wherein the alkali metal ion-containing polymer is included in the electrolyte in an amount of from 0.1 to 5% by weight, based on a total weight of the electrolyte for the lithium-sulfur battery.

5. The electrolyte for the lithium-sulfur battery of claim 1, wherein the lithium salt comprises at least one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(C_2F_5SO_2)_2NLi$, $(SO_2F)_2NLi$, $(CF_3SO_2)_3CLi$, lithium chloroborane, lithium lower aliphatic carboxylate having 4 or less carbon atoms, lithium tetraphenyl borate and lithium imide.

6. A lithium-sulfur battery comprising the electrolyte of claim 1.

7. The electrolyte for the lithium-sulfur battery of claim 1, wherein a number average molecular weight of the alkali metal ion-containing polymer is in a range of from 1,000 to less than 5,000.

8. The electrolyte for the lithium-sulfur battery of claim 1, wherein the alkali metal ion-containing polymer is included in the electrolyte in an amount of from 0.1 to 2% by weight, based on a total weight of the electrolyte for the lithium-sulfur battery.

* * * * *